May 25, 1937.  E. E. HEWITT  2,081,453
RAILWAY BRAKE SYSTEM
Filed June 13, 1935   3 Sheets-Sheet 1

INVENTOR
ELLIS E. HEWITT
BY Wm. M. Cady
ATTORNEY

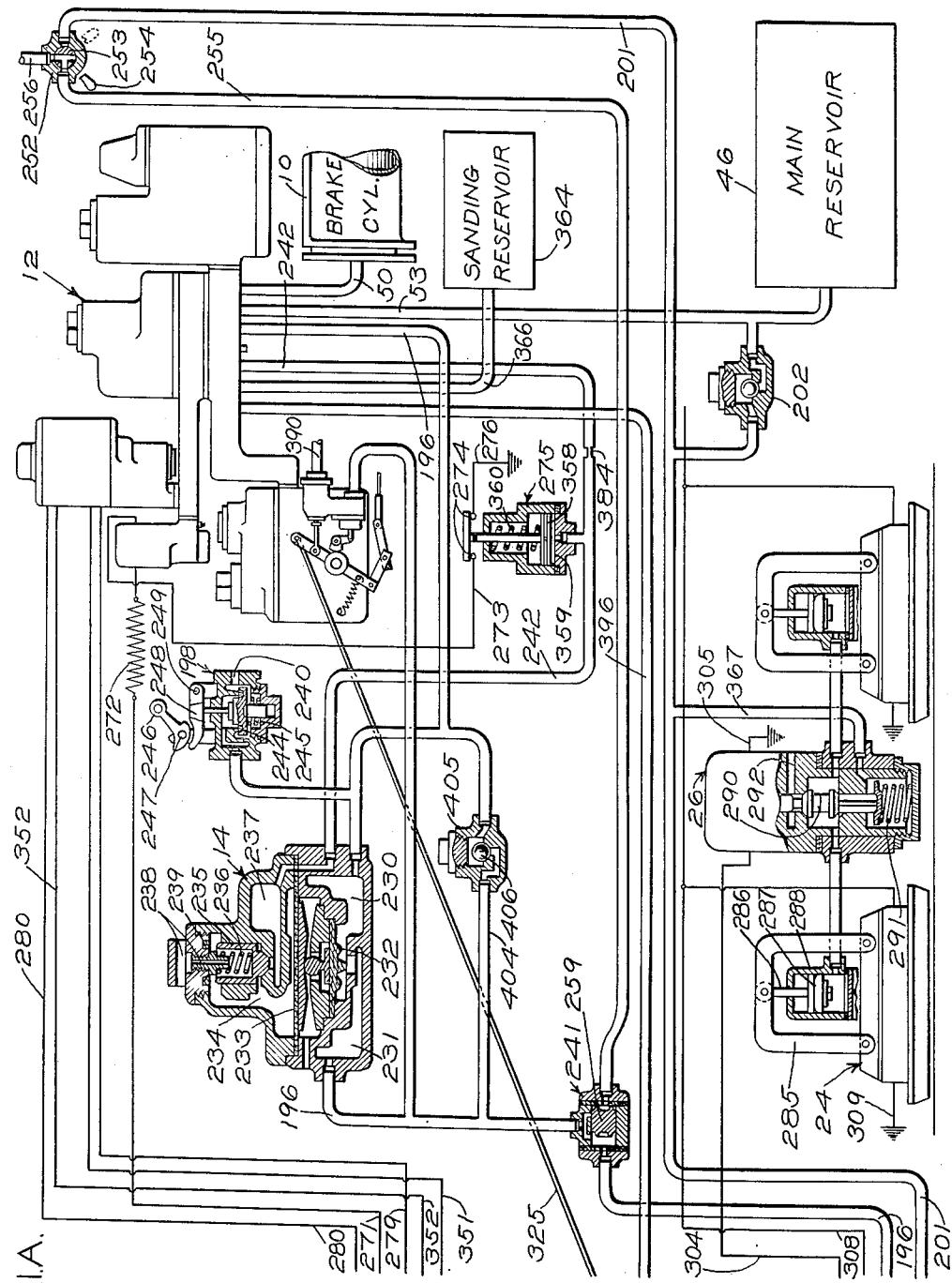

May 25, 1937.  E. E. HEWITT  2,081,453
RAILWAY BRAKE SYSTEM
Filed June 13, 1935  3 Sheets-Sheet 3
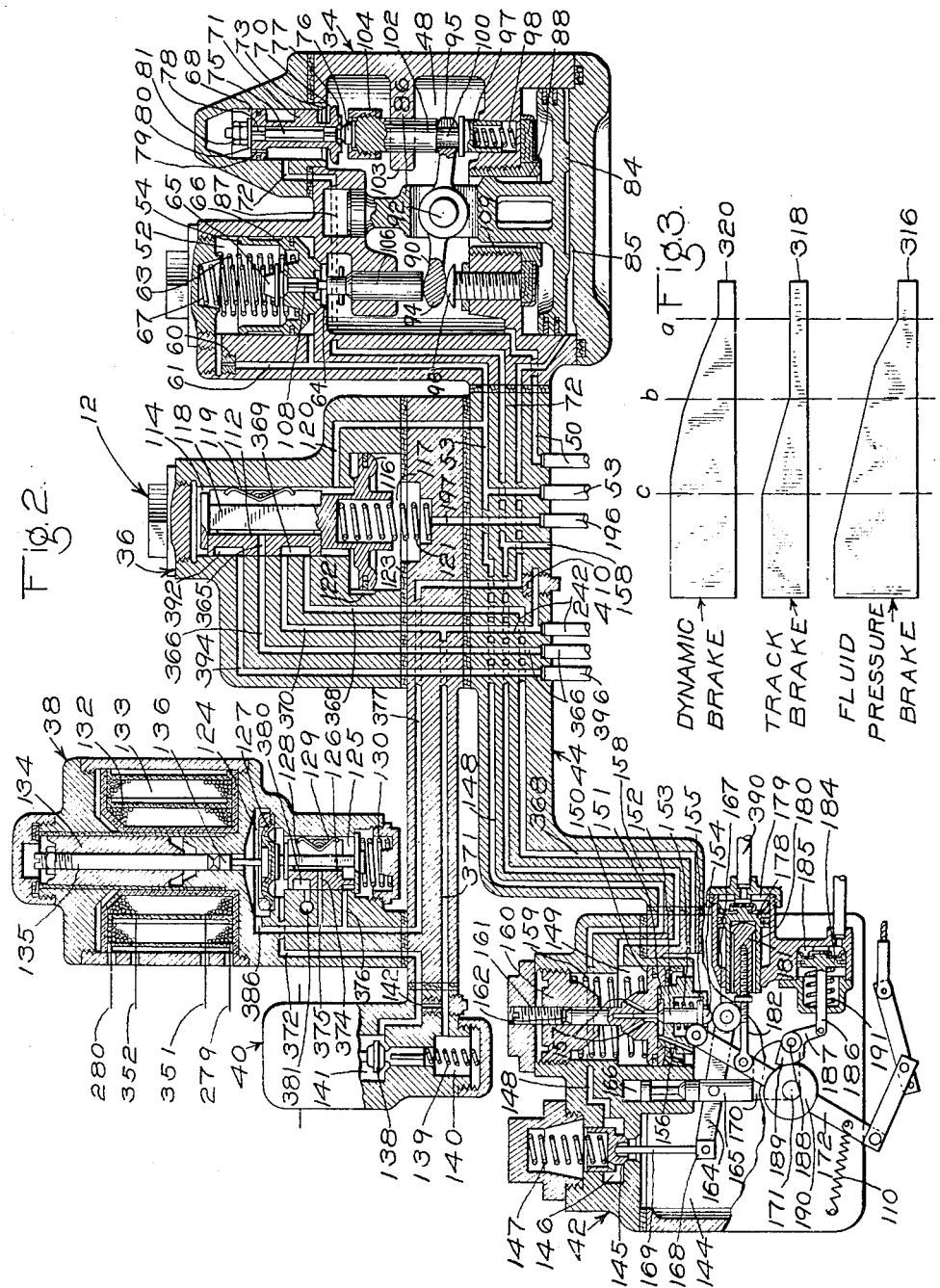
INVENTOR
ELLIS E. HEWITT
BY Wm. M. Cady
ATTORNEY Patented May 25, 1937

2,081,453

UNITED STATES PATENT OFFICE 2,081,453

RAILWAY BRAKE SYSTEM

Ellis E. Hewitt, Edgewood, Pa., assignor to The Westinghouse Air Brake Company, Wilmerding, Pa., a corporation of Pennsylvania Application June 13, 1935, Serial No. 26,394

41 Claims. (Cl. 303—3)

This invention relates to railway brake systems, and more particularly to brake apparatus in which a plurality of brake systems are employed.

When trains or traction vehicles are intended for use in high speed service, the braking apparatus employed must provide for the highest degree of reliability and must be adequate to produce stops in reasonably short times. In order to accomplish this, it has been found desirable to provide a braking apparatus comprising a plurality of braking systems capable of producing high braking forces and so interlocked as to permit of a unified and flexible control, so that the train or vehicle may be brought to a stop in any practical desired limit of time.

The present invention deals with a combined braking equipment of this type in which a fluid pressure brake system and an electrodynamic brake system are provided for producing a braking effect on the vehicle wheels, and in which a track brake system is also provided for producing a braking effect on the track rails. It is a matter of common knowledge that the braking effect produced on the wheels by the fluid pressure brake system is less at the high speeds than at the low speeds, due to the coefficient of friction between the rubbing parts of this brake system being lower at high speeds than at low speeds. On the other hand, the braking effect produced by the electrodynamic brake system is higher at the high speeds than at the low speeds, usually tapering off as the speed diminishes below some low value. Since in a track brake system, the shoes which engage the rail are in sliding contact therewith, the braking effect produced by this brake varies in a manner similar to that of the fluid pressure brakes.

The braking effect which may be produced on the vehicle wheels is of course limited to that which will not produce sliding of the wheels. On the other hand, the braking effect produced by the track brake is not limited in this respect, and can be applied to a degree not limited by the adhesion between wheels and rails. The control provided for a braking equipment combining these three types of brakes must therefore be arranged so that each brake is operated to a degree such that the vehicle or train may be braked smoothly in making service stops, but at the same time provide for a maximum degree of braking which will bring the vehicle or train to a stop in a minimum distance in emergency applications.

A principal object of the present invention therefore is to provide a combined braking equipment employing a plurality of types of brakes, in which a relatively simple and unified control is provided.

A further object of the invention is to provide a braking equipment comprising a plurality of brake systems so interlocked as to provide for the operation of each in relation to the other in a desired sequence or time relation, and arranged so that one brake system is a "stand by" brake to be automatically applied to compensate for loss in effectiveness of the other systems.

A still further object of the invention is to provide a combined braking system of the type above referred to, in which an application of the brakes is ordinarily effected by the movement of a single control element, with the control means so arranged that each brake is operated to a degree and in a time relation with the other brakes as is required to make an effective stop.

A yet further object of the invention is to provide a combined braking system of the type referred to, which has incorporated therein a number of novel safety and interlock features, for the purpose of providing both safety and simplicity in the operation of a train or vehicle.

Yet further objects of the invention, dealing with specific constructions and arrangement of parts will be more fully understood from the following description, which is taken in connection with the attached drawings, wherein Figs. 1 and 1—A taken together, show one embodiment of the invention as adapted to a single vehicle.

Fig. 2 is a diagrammatic view of the control valve device shown in the upper right hand corner of Fig. 1—A.

Fig. 3 is a developed and diagrammatic view of the operating cams shown centrally of Fig. 1.

Figure 1:
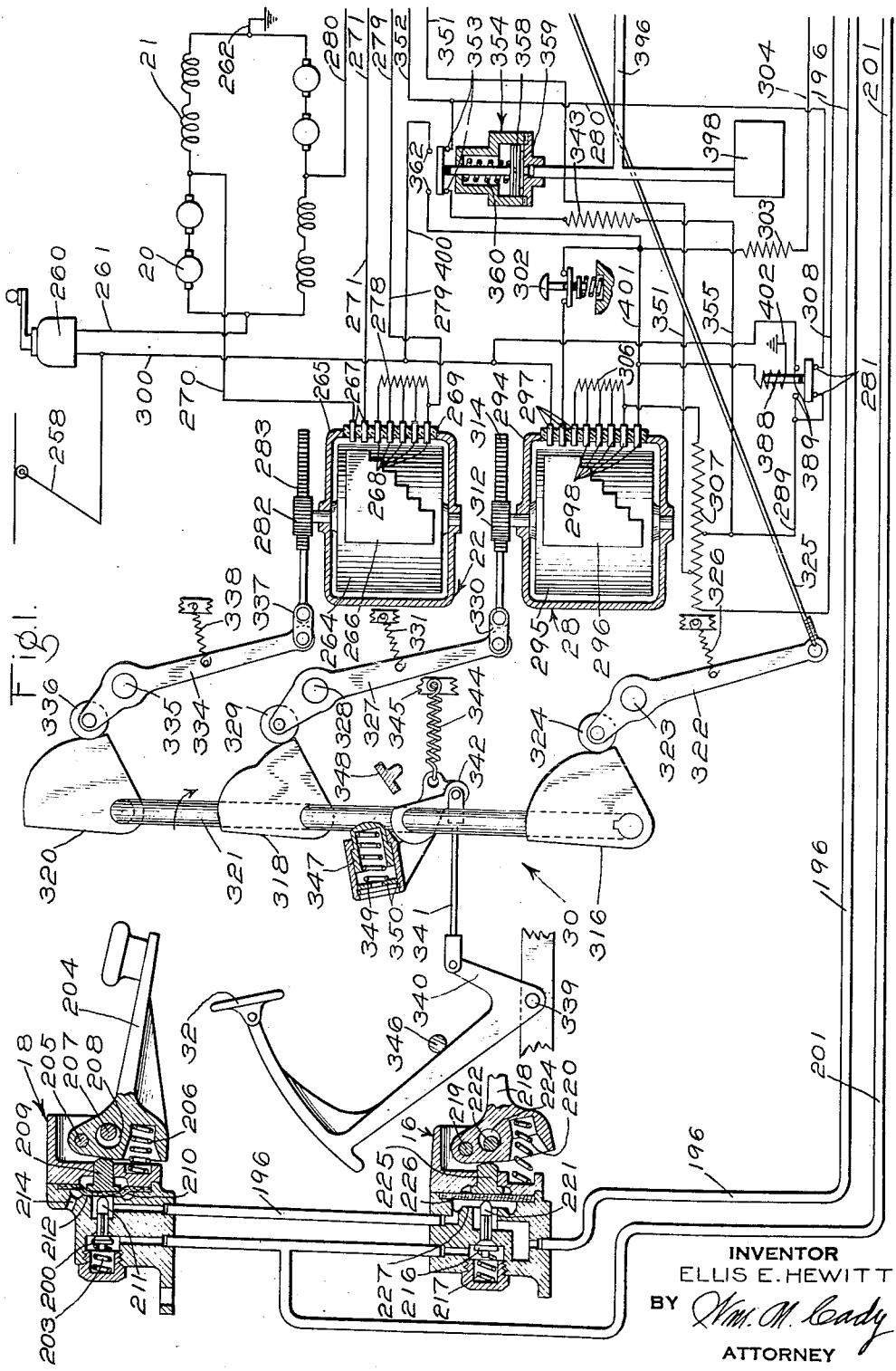

It is to be understood that the drawings illustrate an embodiment in schematic and diagrammatic form only, it being understood by those skilled in the art that in practice the parts and their locations will be in conformity with established practices in the art.

Considering briefly at first the embodiment illustrated, the fluid pressure brake system is shown as comprising a brake cylinder 10 and a control valve device 12 for controlling the supply of fluid under pressure to and its release from this brake cylinder. In addition, this brake system includes a cut-off valve device 14, a foot valve device 16, and a hand valve device 18, these devices comprising the essential elements in a safety control portion of the fluid pressure brake system.

In the electrodynamic brake system, the vehicle driving motors are employed as electrodynamic brake devices to brake the vehicle. These motors are illustrated in Fig. 1 as having armatures 20 and field windings 21. For controlling operation of these motors during braking, there is provided a drum controller device 22.

The track brake system comprises essentially a plurality of magnetic track shoe devices 24, one or more magnet valve devices 26 for controlling raising and lowering of these shoes, and a drum controller device 28 for controlling both the magnet valve device 26 and energization and deenergization of the track shoe devices 24.

The unified control for the three types of brake systems briefly referred to, is shown generally at 30 and is operated from a foot pedal 32.

Various other devices shown but not specifically referred to at this time are provided, and these will be described in the detailed description which now follows.

Considering first the fluid pressure brake system, it is to be understood that one or more brake cylinders 10 may be provided, as for example, one brake cylinder may be provided for each wheel or axle, or one brake cylinder may be provided for a plurality of wheels or axles. Regardless of the number of brake cylinders provided, one control valve device 12 only need be provided on each vehicle.

Considering now this control valve device 12, and referring specifically to Fig. 2, this valve device comprises a relay valve section 34, an emergency valve section 36, a compensating magnet valve section 38, a delay magnet valve section 40, and a brake valve section 42. These sections are suitably secured to a pipe bracket section 44.

The relay valve section 34 is provided with a pressure chamber 48, which is in constant communication with the brake cylinder 10 by way of pipe and passage 50. Disposed in a valve chamber 52 in this section is a supply valve 54, which controls the supply of fluid under pressure from a main reservoir 46 to the pressure chamber 48, and hence to the brake cylinder 10, by way of pipe and passage 53. The portion of the valve chamber 52 below the body of the supply valve 54 is in communication with the portion of the valve chamber above the valve body by way of passage 61 and choke 60.

The supply valve 54 is urged toward a seat 64 by a spring 63. Disposed within the supply valve 54 is a pilot valve 65 urged toward a seat 66 by a spring 67.

The relay valve section 34 is also provided with a release valve chamber 68, in which is disposed a release valve 70. The release valve chamber 68 is in constant communication with the atmosphere by way of a passage 72. When the release valve 70, and its body 71 which slides in the valve chamber 68, are actuated downwardly, the valve moves away from its seat 73 to connect the pressure chamber 48 to the atmosphere, by way of valve chamber 68 and passage 72.

Disposed in an aperture in the release valve body 71 is a valve stem 75 of a diameter slightly less than that of the aperture through the body 71. Secured to the lower end of the stem 75 is a release pilot valve 76. The valve stem 75 is movable longitudinally of the body 71 so that the pilot valve 76 may be urged upwardly toward its seat 77.

Either end of the valve stem 75 is fluted, as at 78, and the upper end of the stem has secured thereto a split ring 80, held in place by nuts 81, so that fluid under pressure may flow past seat 77 and upwardly past the split ring 80 into that portion of the valve chamber 68 above the body 71. A restricted port 79 provides communication to the portion of chamber 68 connected to the atmosphere. The purpose of this arrangement will appear more fully presently.

For actuating the release valve 70 to its seated position, and for effecting unseating of the supply valve 54, there is provided a mechanism operated by a piston 84 disposed in a piston chamber 85. The piston 84 has integral therewith a stem 86, one end of which is slidably disposed in a bore 87, and the other end adjacent the piston 84 being slidably disposed in a bushing 88 carried by a wall defining the piston chamber 85.

Intermediate its ends, the piston stem 86 is slotted to receive a lever 90, which is pivotally mounted at 92 in the slot in the piston stem. To either side of the fulcrum 92 the lever 90 is provided with extensions 94 and 95, the latter being bifurcated. In the lowermost position of the piston 84, the left end 94 of the lever 90 is adapted to rest upon an adjustable stop 96, while the right end 95 rests in the position shown, against opposition of a spring stop 97, urged upwardly by a spring 98.

The right end 95 receives between its bifurcations a reduced portion 100 of a plunger 102, which is slidably carried by a lug 103 projecting from the relay valve casing. The aforementioned release pilot valve 76 is secured to the upper end of the plunger 102 by a sleeve 104, which grips a flange on the release pilot valve as the sleeve is screwed onto a threaded end of the plunger.

The left end 94 of the lever 90 is adapted to engage a plunger 106, which is slidable in a portion of the relay valve housing, and which has its upper end adapted to engage a fluted stem 108 associated with the aforementioned supply pilot valve 65.

The piston 84 is adapted to remain in its lowermost position, as shown in Fig. 2, when the brakes are released, and to be actuated upwardly by the supply of fluid under pressure to piston chamber 85 when effecting an application of the brakes. When the piston 84 moves upwardly the lever 90 pivots about its left end 94, against plunger 106, which is held downwardly by action of the spring 67, and the right end 95 moves upwardly to first seat the release pilot valve 76 and then the main release valve 70.

When the main release valve 70 has been seated, the lever 90 fulcrums about its right end 95 and the left end 94 is then actuated upwardly to unseat the supply pilot valve 65. When this pilot valve is unseated fluid under pressure in the valve chamber 52 above the valve 54 flows past the unseated pilot valve 65 to the pressure chamber 48. This release of pressure above the supply valve 54 unloads the valve, so that when the upper end of the plunger 106 engages the lower edge of the supply valve 54 it will be unseated at a much lower pressure than before being unloaded. The choke 60 restricts the flow of fluid under pressure to the space above the valve during this operation, so that the unloading is effectively accomplished. The supply valve will therefore be unseated quickly.

When the main supply valve 54 is thus unseated, fluid under pressure flows from the main reservoir 46 to the pressure chamber 48, and from thence to the brake cylinder 10, through the passages heretofore described. Fluid under pressure in the chamber 48 also flows to the piston chamber 85 above the piston 84, by way of leakage groove 109, until the pressures above and below the piston 84 are substantially equal. When this takes place the piston 84 moves downwardly until the main supply valve 54 and pilot valve 65 are seated. The supply of fluid under pressure to chamber 48, and the brake cylinder 10, is then lapped.

When the pressure in piston chamber 85 is reduced, as when released to the atmosphere, piston 84 moves further downwardly to unseat the release pilot valve 76. When this pilot valve is unseated, fluid under pressure in the pressure chamber 48 flows past the unseated release pilot valve and on either side of the valve stem 75 to the portion of the release valve chamber 68 above the body 71. Pressure in this portion of the release valve chamber will then exert a downward force on the body 71 corresponding substantially to the upward force exerted on the main release valve 70 from the pressure chamber 48. The release valve is then unloaded, so that as the right end 95 of the lever 90 moves downwardly the release valve 70 will be unseated, to release fluid under pressure from the pressure chamber 48 to the atmosphere, by way of passage 72. The restricted port 79 insures that the pressure above the body 71 will reduce to atmospheric pressure with that in chamber 48.

Considering now the emergency valve section 36, this device comprises a main slide valve 112 disposed in a valve chamber 114, and adapted to be actuated by a piston 116 disposed in a piston chamber 117. The piston 116 has associated therewith a stem 118 suitably designed to receive the slide valve 112 and move it coextensive with movement of the piston 116. A bow spring 119 is provided to assist in holding the slide valve 112 upon its seat.

The slide valve chamber 114 is in communication with the main reservoir 46 by way of passage 120, and pipe and passage 53. A spring 121 urges the piston 116 to an upper or biased position, in which a feed groove 122 connects the slide valve chamber 114 and the piston chamber 117. When the pressure in the piston chamber 117 is suddenly reduced, the overbalancing pressure in the slide valve chamber 114 urges the piston 116 downwardly until the piston engages gasket 123. The feed groove 122 is closed during this downward movement, and the slide valve 112 functions to effect communication which will be more fully described hereinafter.

The compensating magnet valve section 38 is embodied in a casing provided with a slide valve chamber 125 in which is disposed a slide valve 126. At the top end of the slide valve chamber 125 there is secured in the casing of this valve device a flexible diaphragm 127, which has associated therewith a stem 128 having collars thereon for receiving the slide valve 126 so as to operate the slide valve co-extensive with movement of the diaphragm. A bow spring 129 is provided to assist in holding the slide valve 126 upon its seat. A helical spring 130 acts upon the stem 128 to urge the slide valve 126, and diaphragm 127, to an uppermost or biased position.

The diaphragm 127 is subject on its lower side to pressure from the slide valve chamber 125 and on its upper side to pressure from a chamber 124 and force produced by an electromagnet comprising an inner winding 132 and an outer winding 133. These two windings are concentrically disposed and are effective when energized to produce a magnetic flux in the surrounding metallic casing of the valve device. Disposed within and circumscribed by these two windings, and slidable in the valve device casing, is a movable core 134, which has secured thereto a stem 135 for engaging a coacting stem 136 associated with the diaphragm 127. When either or both of the windings 132 and 133 are energized, the flux established thereby is effective in urging the movable core 134 downwardly, whereupon the stem 135 exerts a downward pressure upon diaphragm 127, in opposition to spring 130 and the pressure of fluid on the diaphragm from slide valve chamber 125. The purpose and functioning of this valve device will be more fully described in the description of operation of this embodiment.

The delay magnet valve section 40 is embodied in a casing and provided with a valve 138 which is urged toward an unseated position by a spring 139, and toward a seated position by action of an electromagnet in the upper part of the casing, which when energized actuates the valve downwardly. The valve 138 controls communication between a lower chamber 140 and an upper chamber 141. When the valve 138 is seated, a restricted communication is provided by a choke 142 between these two chambers.

The brake valve section 42 is of the self-lapping type and is embodied in a casing defining a pressure chamber 144. For controlling the supply of fluid under pressure to this pressure chamber 144, there is provided a supply valve 145 disposed in a supply valve chamber 146 and urged toward a seated position by a spring 147. The valve chamber 146 is in communication with the main reservoir 46, by way of passage 148, and pipe and passage 53.

The brake valve device is also provided with a chamber 149 in which is operatively mounted a movable abutment 150 in the form of a piston, which contains interiorly thereof a release valve chamber 151. Disposed in the release valve chamber 151 is a release valve 152, which is urged away from its seat by a spring 153. The release valve 152 has an extended stem 154 provided with an annular shoulder 155 for engaging a flange on the movable abutment, to limit the travel of the release valve away from its seat.

The release valve chamber 151 is in communication with the pressure chamber 144 through a passage 156 in the movable abutment. When the release valve 152 is unseated, the pressure chamber 144 is in communication with the atmosphere, by way of passage 156, past the unseated release valve 152, passages 157, chamber 149, and passage 158.

The movable abutment 150 is subject on one side to fluid pressure in the pressure chamber 144 and on the other side to the pressure of a regulating spring 159. Tension on the spring 159 is regulated by a regulating member 160, which has a bore therein for receiving a guiding plunger 162 associated with the movable abutment. An adjusting screw 161 is provided for regulating movement of the movable abutment upwardly.

It will thus be seen that the supply valve 145 controls the supply of fluid under pressure to the pressure chamber 144, and the release valve 152 controls the release of pressure therefrom to the atmosphere.

For operating the supply valve 145 and the release valve 152, there is provided a mechanism including spaced levers 164 carried intermediate their ends by a movable pivot carrier 165. This movable pivot carrier is slidable in a bore 166 in the valve device casing. Rotatably disposed between the right hand ends of the spaced levers 164 is a roller 167, which is adapted to engage the extended stem 154 of the release valve 152. Loosely held between the left hand ends of the spaced levers 164 is a member 168 carrying a rod 169 having one end thereof disposed in a recess in the supply valve 145.

The spaced levers 164 are intended to effect a seating of the release valve 152 and an unseating of the supply valve 145 when the movable pivot carrier 165 is actuated upwardly. For actuating the pivot carrier 165 upwardly, there is provided a cam 170 secured to an operating shaft 171, which shaft is adapted to be rotated by movement of a lever 172. As shown in Fig. 2, the cam 170 has a configuration such that when the shaft 171, and the lever 172, are rotated in a counterclockwise direction the pivot carrier 165 is actuated upwardly various distances, as will hereinafter more clearly appear. A spring 110 biases the lever 172 to a release position.

Movement of the pivot carrier 165 upwardly carries with it the spaced levers 164. Now the supply valve spring 147 offers a greater resistance to this movement than the release valve spring 153, and the regulating spring 159 offers a greater resistance than either or both of these two springs. Therefore, upon movement of the pivot carrier upwardly, the spaced levers 164 first fulcrum about their left end to cause seating of the release valve 152, and when this valve is seated fulcrum about their right end to then cause unseating of the supply valve 145. During this operation the regulating spring 159 is unappreciably compressed.

With seating of the release valve and unseating of the supply valve, fluid under pressure is supplied from the main reservoir 46 to the pressure chamber 144. The pressure chamber 144 is at times in communication with the relay valve piston chamber 85, by way of the emergency valve section 36, the delay magnet valve section 40, and the compensating magnet valve section 38, as will be more fully described in the description of operation of this embodiment of the invention.

As the pressure in the pressure chamber 144 rises it will act upon the movable abutment 150 to compress the regulating spring 159, and when this spring has been compressed sufficiently the left end of spaced levers 164 will move downwardly, thereby permitting supply valve 145 to seat. A little thought will show that if the pivot carrier 165 is actuated upwardly a given distance after the release valve 152 is seated, the supply valve 145 will be unseated a proportional distance. Therefore, the pressure required in the pressure chamber 144 to effect seating of the supply valve by movement of the movable abutment upwardly, will likewise be proportional to this distance.

When the supply valve 145 is seated, the supply of fluid to the relay valve piston chamber 85 will be lapped and it will therefore be apparent that the pressure at which this supply laps is governed by the degree of movement of the pivot carrier 165 upwardly, and hence according to the degree of movement of the lever 172. The degree of pressure established in the pressure chamber 144 then corresponds to the degree or extent of movement of the lever 172.

For holding the brake valve section 42 in application position while passengers are entering or leaving the vehicle, there is provided a mechanism having a piston 178 disposed in a piston chamber 179 and adapted when fluid under pressure is supplied to this chamber to be actuated to the left to provide a stop for preventing return movement of the lever 172 to release position. The piston 178 is provided with a hollow stem 180 in which is slidably disposed a member 181 having adjustably secured thereto a pin 182 connected to the upper end of the lever 172, as shown in Fig. 2. Since the member 181 is slidable with respect to the piston 178, operation of the lever 172 in a counterclockwise direction by other control means is not impeded by the piston 178, but when the lever 172 has been operated to some predetermined application position and fluid under pressure is supplied to the piston chamber 179, the lever is held in this application position until this pressure has been released or diminished sufficiently for the spring 110 to return the lever 172 to its release position.

For the purpose of holding the brake valve device 42 in application position when during an application of the fluid pressure brakes the operator releases pressure manually applied to elements of the hand valve device 18 and foot valve device 16 (as will be more fully described hereinafter) there is provided another mechanism comprising a piston 184 disposed in a piston chamber 185, and having a stem 186 connecting with a bell crank lever 187. The bell crank lever 187 is pivotally mounted to the casing at 188 and one arm thereof comprises a cam 189 adapted to engage a coacting cam 190 secured to the operating shaft 171 of the brake valve section.

A spring 191 urges the piston 184 to the right, so that when the piston is unopposed by fluid pressure in the piston chamber 185, the cam 189 is actuated into frictional engagement with the cam 190 of the brake valve section, to thereby hold the brake valve section in the application position to which it has been actuated.

The piston chamber 185 is normally supplied with fluid under pressure, so that the bell crank lever 187 is rotated in a clockwise direction to disengage the cam 189 from engagement with the cam 190, but when fluid under pressure is released from the piston chamber 185 the two cams are caused to engage to hold the brake valve section in application position.

When effecting regular or service applications of the fluid pressure brakes, the brake valve section 42 is operated, and when effecting safety control or emergency applications the emergency valve section 36 is operated. The piston chamber 117 of the emergency valve section 36 is connected to a safety control pipe 196, by way of passage 197, and this safety control pipe is normally maintained charged with fluid under pressure, which may be reduced by simultaneous operation of the hand valve device 18 and the foot valve device 16, or by operation of a vent valve device 198.

The hand valve device 18 is embodied in a casing provided with a valve 200 for controlling communication between a main reservoir pipe 201, which connects with the main reservoir 46 by way of a check valve 202, and the safety control pipe 196. The valve 200 is urged toward a seated position, to cut off this communication, by a spring 203, and is urged toward an unseated position, to open this communication, by the downward movement of a hand controlled element 204. The hand element 204 is pivotally mounted at 205, and is urged upwardly by a spring 206. Movement of the hand element 204 upwardly or downwardly is limited by a pin 207 extending in an enlarged aperture 208 of the element.

When the hand element 204 is actuated downwardly, it engages a plunger 209, which through a diaphragm 210 urges a stem 211 of the valve 200 to the left to unseat the valve. At the same time, the diaphragm 210 is pressed against a seat 212 to close communication between the safety control pipe 196 and a port 214 leading to the atmosphere. When downward pressure on the hand element 204 is released, spring 206 urges the element upwardly, whereupon the diaphragm 210 is urged away from its seat and a communication is established between the safety control pipe 196 and the atmosphere, while at the same time spring 203 seats the valve 200 to cut off communication with the main reservoir pipe 201.

The foot valve device 16 is similar in its functional significance to the hand valve device 18. This valve device is embodied in a casing having a valve 216 for also controlling communication between the main reservoir pipe 201 and the safety control pipe 196. This valve is urged toward a seated position by a spring 217, and is adapted to be actuated to unseated position by downward movement of a foot pedal 218. The foot pedal 218 is pivotally mounted at 219 and is normally urged upwardly by a spring 220. Upward and downward movement of the foot pedal is limited by a pin 222 disposed in an enlarged aperture 224.

When the foot pedal 218 is actuated downwardly, a slidable plunger 225 engages a diaphragm 226 to urge the valve 216 to an unseated position through its stem 221. At the same time, the diaphragm 226 is pressed against a seat 227 to isolate the hand valve device 18 from the safety control pipe 196. When pressure manually applied to the foot pedal 218 is released, the safety control pipe 196 is again connected to the hand valve device 18, and the communication formed between the main reservoir pipe 201 and the safety control pipe 196 by unseating of the valve 216 is cut off.

It will thus be observed that if both the hand element 204 and the foot pedal 218 are in their uppermost positions communication between the main reservoir pipe 201 and the safety control pipe 196 is cut off, and the safety control pipe will be vented to the atmosphere. When either the hand element 204 or the foot pedal 218 is in its lowermost position, the communication between the safety control pipe 196 and the atmosphere is cut off and communication is maintained between the safety control pipe and the main reservoir pipe. The operator may, therefore, maintain pressure on either the hand element 204 or the foot pedal 218 to maintain the safety control pipe fully charged, but upon simultaneous release of pressure on these two elements the safety control pipe will be vented to the atmosphere.

In order to permit the operator to remove pressure from both the hand element 204 and the foot pedal 218 when a predetermined service application of the fluid pressure brakes has been made by operation of the brake valve device 42, the cut-off valve device 14 is provided and connected as shown in Fig. 1—A. This valve device is embodied in a casing provided with a chamber 230 connected to one portion of the safety control pipe 196 and a chamber 231 connected to another portion of the safety control pipe 196. A valve 232 is provided for controlling communication between the two chambers 230 and 231.

The valve 232 is of the diaphragm type and remains normally in an unseated position, so as to establish communication between the two chambers 230 and 231. For actuating the valve 232 to seated position, there is provided a diaphragm 233 which is subject to pressure in a chamber 234. The supply of fluid under pressure to and its release from the chamber 234 is controlled by a piston valve 235. The piston valve 235 is urged downwardly to a lower seated position by a spring 236, and is designed to be urged toward an upper seated position by pressure acting therebelow from a supply chamber 237.

When the valve 235 is in lower seated position, the chamber 234 is in communication with the atmosphere by way of passages 238. When the supply of fluid under pressure to the supply chamber 237 has reached a predetermined value, its action on the lower side of valve 235 overcomes the tension of spring 236 and urges the valve upwardly into sealing engagement with a seat gasket 239. Fluid under pressure then flows from the supply chamber 237 past the open lower seat of valve 235 to the chamber 234. Fluid under pressure in the chamber 234 actuates the diaphragm 233 downwardly to cause seating of the valve 232.

When the pressure in the supply chamber 237 is diminished below a predetermined value, spring 236 urges the valve 235 away from its upper seat and to its lower seat, whereupon the pressure of fluid in the chamber 234 is diminished to zero, and the valve 232 is unseated.

The supply chamber 237 is connected by pipe 242 to the control valve device 12, which functions to supply fluid under pressure to the supply chamber 237 when the brake valve section 42 of the control valve device has been operated to supply fluid at a predetermined pressure to the brake cylinder 10. Therefore, when a predetermined application of the fluid pressure brakes has been effected, and valve 232 has been seated, it will be obvious that the operator may remove pressure from both the hand element 204 and the foot pedal 218, without effecting operation of the emergency valve section 36 of the control valve device, because seating of the valve 232 will maintain that portion of the safety control pipe 196 connected to the emergency valve section fully charged.

The vent valve device 198 is embodied in a casing provided with a valve 244 urged toward its seated position by spring 245. For unseating the valve there is provided a lever 246 pivotally mounted at 247 and adapted when operated in a counterclockwise direction to actuate a second lever 248 about its pivot 249 to effect unseating of the valve 244. When the valve 244 is unseated, the portion of the safety control pipe 196 adjacent the emergency valve section 36, in the control valve device 12, is vented to the atmosphere through exhaust port 240, whereupon the emergency valve section will function to effect an emergency application of the brakes, as will hereinafter be more fully described.

For effecting an application of the fluid pressure brakes from the rear of the vehicle, there is provided a rear-end brake valve device 252. This valve device is provided with a rotary valve 253 operable by a handle 254. When the handle 254 is in the position shown in solid lines in Fig. 1—A, the rotary valve 253 connects a pipe 255 to the atmosphere, by way of exhaust pipe 256, and when the handle 254 is in the position shown in dotted lines, pipe 255 is disconnected from the atmosphere and connected to main reservoir pipe 201.

Pipe 255 is connected to a double check valve device 241 which is disposed in the safety control pipe line 196. The double check valve device 241 is embodied in a casing provided with a sliding valve 259, which is operable either to the left or right depending upon the pressure acting thereon. When the pressure to the left is greater than the pressure to the right, the valve assumes the position shown in Fig. 1—A, thereby providing an open communication between the two portions of the safety control pipe connected thereto. When the pressure to the right of the valve 259 is greater than the pressure to the left, the valve moves to the left blanking off the portion of the safety control pipe 196 leading to the foot valve device 16 and hand valve device 18, and establishing communication between the pipe 255 and the after portion of the safety control pipe 196.

If therefore pressure has been released from both the hand element 204 and the foot pedal 218, application and release of the fluid pressure brakes may be controlled by manipulating the handle 254 of the rear-end brake valve device 252. Manipulation of this brake valve device will vary the pressure in the after portion of the safety control pipe 196, and thereby control operation of the emergency valve section 36 of the control valve device 12, to supply fluid under pressure to and release it from the brake cylinder 10.

Considering now the dynamic brake system, the driving motors which comprise the essential elements of this brake system are normally supplied current from a trolley 258, through operation of a motor controller device 260, when the vehicle is being propelled by the motors. Current from the trolley 258 passes through the motor controller 260, conductor 261, the parallel arrangement of the armatures 20 and field windings 21, and then to ground by way of conductor 262.

When the controller 260 is operated to an off or braking position, the motors are disconnected from the trolley 258 and are thereafter free to operate as generators. The dynamic braking controller device 22 thereafter controls operation of the motors as generators.

This controller device 22 is shown diagrammatically in Fig. 1 and essentially comprises a rotatable drum 264 suitably mounted in a casing 265 and carrying a stepped contact 266 secured thereto and insulated therefrom. The contact 266 is adapted to engage simultaneously a pair of stationary contact fingers 267, and sequentially thereafter a plurality of contact fingers 268. All of these stationary contact fingers are secured to and insulated from the casing 265 by an insulating member 269.

When the contact fingers 267 are bridged by the stepped contact 266, the electromagnet in the delay magnet valve device 40 is energized from the vehicle motors, now operating as generators, through a circuit including conductor 270, contact fingers 267, conductor 271, resistance device 272, which functions to limit the current in the circuit, the magnet valve device 40, conductor 273, contacts 274 of a pneumatic switch device 275, and from thence back to the car motors by the way of ground connections 276 and 262.

When the stepped contact 266 engages one or more of the stationary contact fingers 268, the outer winding 133 of the compensating magnet valve device 38 is connected to the car motors, through a circuit including conductor 270, contact fingers 267 and 268, all or a portion of resistance 278, conductor 279, winding 133, and conductor 280 back to the car motors.

For rotating the drum 264, there is provided a rack and gear mechanism comprising a gear 282 secured to and rotatable with the drum 264 and rotatable by engagement with a rack 283.

Considering now the track brake system, the magnetic track shoe devices 24 may be of any suitable design, such as those now employed for this kind of service, and are preferably provided with yoke elements 285 pivotally connected to a stem 286 of a piston 287 disposed in a raising cylinder 288. When fluid under pressure is supplied to the raising cylinder 288, the piston 287 is actuated upwardly to lift or raise the shoe 24 above the co-acting track rail. When fluid under pressure is released from the raising cylinder 288, the shoe 24 is permitted to drop by gravity to engagement with the track rail.

The magnet valve device 26 is provided for controlling the supply of fluid under pressure to and its release from the raising cylinder 288. This magnet valve device is embodied in a casing provided with a double beat valve 290, which is urged toward an upper seated position by a spring 291, and toward a lower seated position by action of an electromagnet in the valve device casing, which when energized actuates the double beat valve 290 downwardly.

When the double beat valve 290 is in upper seated position, fluid under pressure is supplied from the main reservoir pipe 201, past the open lower valve seat, to the raising cylinder 288, to maintain the track shoe devices 24 in raised position. When the double beat valve 290 is in lower seated position, the supply of fluid under pressure to the raising cylinder 288 is cut off, and the pressure in the raising cylinder is released to the atmosphere past the upper open seat and through a port 292.

For controlling operation of the magnet valve device 26 and energization of the track shoe devices 24, the aforementioned track brake controller device 28 has been provided. This device is similar to the dynamic controller device 22, and is embodied in a casing 294 having rotatably disposed therein a drum 295 provided with a stepped contact 296 secured thereto and insulated therefrom. The stepped contact 296 is adapted to simultaneously engage three stationary contact fingers 297 and thereafter successively a plurality of stationary contact fingers 298. When the stepped contact 296 has bridged the three contacts 297, a circuit is established from the trolley 258 to the electromagnet of the magnet valve device 26, by way of conductor 300, the two upper contacts 297, the closed contacts of a push switch 302, a resistance device 303, conductor 304, and the magnet valve device 26, the return circuit being by way of ground connection 305.

At the same time, a circuit is established to the track shoe devices 24, which includes conductor 300, the lower contact 297, all of resistance 306, a resistance device 307, conductor 308, and the windings of the track shoe devices 24, the return circuit from each track shoe device being by way of a ground connection 309. As the stepped contact 296 successively engages the contact fingers 298, portions of the resistance 306 will be cut out of this circuit.

For rotating the drum 295, there is provided a rack and gear mechanism comprising a gear 312 and a rack 314, which mechanism functions similar to that described in connection with the dynamic controller device 22.

Considering now the unitary control mechanism 30, which has been shown in diagrammatic form in Fig. 1, this mechanism comprises essentially three cams 316, 318 and 320, each of which is secured to a common shaft 321. This shaft may be rotatably supported by any suitable mounting, which has been omitted for the sake of clarity. The cams 316, 318 and 320 have been shown in their developed form in Fig. 3, and are there arranged to show the relative positions of the cam surfaces when the shaft 321 is rotated.

The cam 316 controls operation of the brake valve device 42, through a lever 322, which is pivotally mounted intermediate its ends at 323 and carries in one end a roller 324 for engagement with the cam. The other end of the lever 322 is connected to the lever 172 of the brake valve device 42 through a cable 325. A spring 326 is provided to urge the roller 324 into contact with the cam.

The cam 318 controls operation of the track brake controller device 28, through a lever 327, which is pivotally mounted intermediate its ends at 328 and provided in one end with a roller 329 for engaging the cam. The other end of the lever 327 is connected through a link 330 with the rack member 314. A spring 331 urges the roller 329 into engagement with the cam 318.

The cam 320 controls operation of the dynamic brake controller device 22, through still another lever 334, which is pivotally mounted at 335 and carries in one end a roller 336 for engaging the cam. The lever 334, like the lever 327, is connected through a link 337 with the rack 283. A spring 338 urges the roller 336 into engagement with the cam 320.

It will thus be obvious that when the shaft 321 is rotated in a clockwise direction, that the three cams operate the three associated levers to control operation of the brake valve device 42 and the two controller devices 22 and 28. For rotating the shaft 321 in a clockwise direction, there is provided the aforementioned foot pedal 32. This foot pedal is pivotally mounted to some part of the vehicle frame at 339, and is provided with an extension 340 connected through a link 341 to a lug 342 rigidily secured to the shaft 321. A spring 344, which has one end thereof connected to a portion 345 of a suitable housing and the other end thereof connected to an eye in the lug 342, functions to return the shaft 321 to its release position, where the foot pedal 32 rests against a stop 346.

When the shaft 321 has been rotated to a predetermined degree, a spring-pressed plunger 347 engages a rigid stop 348, and thereafter rotation of the shaft 321 is additionally opposed by a spring 349, which urges the plunger 347 outwardly of its housing. The spring 349 is retained in the housing by a snap-ring and washer 350. The purpose of this arrangement will appear more fully in the description of operation of this embodiment.

When current is supplied to the track shoe devices 24, the flow of current through the resistance device 307 effects energization of the inner winding 132 of the compensating magnet valve section 38, through a circuit which includes, beginning at the resistance device 307, conductor 351, winding 132 and conductor 352, from where the circuit divides, one branch being by way of the contacts 353 of a pneumatic switch device 354, resistance device 343, and conductor 355, and the other branch being by way of conductor 280, contacts 281 of a relay 388, and conductor 289.

Since conductors 351 and 355 are connected across a portion of the resistance 307, energization of the compensating magnet winding 132 depends upon the voltage drop across this portion of the resistance device.

The pneumatic switch devices 275 and 354 are similar in design, each containing a piston 358 disposed in a piston chamber 359 and urged downwardly by a spring 360. When fluid under pressure is supplied to the piston chambers 359, the pistons 358 are actuated upwardly, to open contacts 274 in the case of the switch device 275 and to open contacts 353 and close contacts 362 in the case of switch device 354. The purpose of these two switch devices will be more apparent from the description of operation hereinafter.

The operation of this embodiment of my invention is as follows:

*Running condition*

When the vehicle is being propelled under power, the motor controller 260 is in a position in which current is being supplied to the motors from the trolley 258. At all times during running condition, whether coasting or under power, the foot pedal 32 is permitted to remain in the release position shown in Fig. 1, while the operator maintains pressure on either the hand element 204 of the hand valve device 18, or on the foot pedal 218 of the foot valve device 16. This maintains the safety control pipe 196 in communication with the main reservoir pipe 201.

With the foot pedal 32 in release position, the parts of the brake equipment will be in the positions shown in the drawings. Each of the brake systems will therefore be in release position and no retarding effect will be produced by either brake system on the vehicle.

When the parts of the fluid pressure brake system are in release position, the safety control pipe 196 is maintained charged through either the foot valve device 16 or the hand valve device 18, or by way of the feed groove 122 in the emergency valve section 36 of the control valve device 12. In addition, a sanding reservoir 364 is charged through a port 365 in the slide valve 112 of the emergency valve section 36, and through pipe and passage 366.

When the track shoe devices 24 are held in upper position, fluid under pressure is supplied to the raising cylinder 288 from the main reservoir pipe 201 by way of branch pipe 367, and past the open lower seat of double beat valve 290 in magnet valve device 26.

*Service application*

When it is desired to effect a service application of the brakes, the motor controller 260 must first be turned to the off or braking position. The foot pedal 32 is then depressed to a degree according to the desired degree of braking. Shaft 321 and cams 316, 318 and 320 are thus rotated in a clockwise direction to a corresponding degree. Assuming for the sake of illustration that the cams are rotated to a degree corresponding to the distance between lines *a* and *b* in Fig. 3, it will be obvious that cam 316 will effect operation of the brake valve section 42, in the control valve device 12, to effect a supply of fluid under pressure from the main reservoir 46 to the pressure chamber 144, by way of pipe and passage 53, passage 148, and past the unseated supply valve 145.

Therefore, if the parts of the delay magnet valve device 40 and the compensating magnet valve device 38 were to remain in the positions shown in Fig. 2, fluid under pressure would flow from the pressure chamber 144 to the relay piston chamber 85, through a communication including passage 368, cavity 369 in emergency slide valve 112, passage 370, passage 371, past the unseated valve 138, passage 372, slide valve chamber 125 in the compensating magnet valve device 38, port 374 in slide valve 126, passages 375 and 376, and finally through passage 377 to the relay piston chamber.

However, at the same time cam 316 operates the brake valve section 42, cam 320 operates the dynamic brake controller device 22, to first connect the delay magnet valve device 40 to the motors (now operating as generators), and to then connect the outer winding 133 of the compensating magnet valve device 38 to the motors (now acting as generators), through the circuits previously described.

The electromagnet of the magnet valve device 40 is responsive to a low value of current thus supplied thereto, and immediately actuates its valve 138 downwardly to close the communication between the brake valve section 42 and relay valve piston chamber 85 just described. However, fluid under pressure may continue to flow around the valve 138 through the choke device 142, but at a much more restricted rate.

Energization of the outer winding 133 of the compensating magnet valve device causes the movable core member 134 to be actuated downwardly and thus shift the slide valve 126 to a position where passage 376 is blanked and passage 375 is connected by cavity 380 to an exhaust port 381. The supply of fluid under pressure to the relay valve chamber 85 is thus definitely cut off, and the fluid supplied thereto vented to the atmosphere.

Fluid supplied to the communication leading to the relay piston chamber 85 also flows from passage 370 through pipe and passage 242 and choke 384 to the piston chamber 359 of the pneumatic switch device 275, and also to the supply chamber 237 of the cut-off valve device 14. When after a chosen length of time, as determined by the choke 384, the pressure in the pneumatic switch device 275 has reached a value sufficient to overcome the tension of the spring 360, the piston 358 will be actuated upwardly to open contacts 274. Opening of these contacts interrupts the circuit to the delay magnet valve device 40, and it thereupon permits its valve 138 to be unseated by spring 139. The communication to the relay valve piston chamber 85 will, however, be closed at this time, due to the operation of the compensating magnet valve device 38 previously described.

The purpose of initially energizing the delay magnet valve device 40 and then deenergizing it when the pressure supplied to the pneumatic switch device 275 has reached a predetermined value, is to permit time enough for the dynamic brake system to become effective and thus energize the winding 133 of the compensating magnet valve device.

While the delay magnet valve device 40 is energized, fluid flowing through the choke 142 slowly builds up a pressure in the slide valve chamber 125, but the downward force due to energization of the winding 133 holds the slide valve 126 in its lower position, so that no application of the fluid pressure brake takes place.

Now when the valve 138 is unseated fluid under pressure flows to the slide valve chamber 125 at a greater rate. The ultimate value of the pressure in slide valve chamber 125 is determined by the degree of operation of the brake valve section 42, which in turn is controlled by the cam 316. The downward force on diaphragm 127 depends upon the degree of dynamic braking, which is controlled by the cam 320. The parts are so designed that for rotation of the cams corresponding to the distance $a$—$b$ in Fig. 3, the force due to dynamic braking overbalances the force due to fluid pressure in the slide valve chamber 125. Therefore, so long as the dynamic brake system is functioning properly, the degree of energization of the winding 133 will be such that sufficient force will be exerted downwardly on the diaphragm 127 to maintain the slide valve 126 in a position where passage 376 is blanked and passage 375 is connected to exhaust port 381. Therefore, it should be obvious that no application of the fluid pressure brakes will result so long as the dynamic brakes are effective to a desired degree.

Now if the foot pedal 32 is depressed further, to a degree such that the cams are rotated to a degree corresponding to the distance between lines $b$ and $c$ of Fig. 3, cam 316 will operate the brake valve section 42 to supply fluid under pressure to the pressure chamber 144 to a greater degree, and the dynamic brake controller device 22 will operate to cut out additional portions of the resistance 278, to increase the degree of current in the dynamic braking circuit. At the same time, cam 318 now actuates the track brake controller device 28 to energize the magnet valve device 26, to effect lowering of the track shoe devices 24 to engagement with the track rail, and to also energize these track shoe devices.

It will be noted that for the movement of the cams assumed, all of the resistance 306 will be cut out by the track brake controller device 28. When the stepped contact 296 of this device has engaged the lowermost stationary finger 298, relay 388 is energized, and contacts 281 are opened and contacts 389 closed. Closing of contacts 389 forms a by-pass circuit from the trolley conductor 300 around the track brake controller device 28, to the track shoe devices 24, with only a portion of the resistance device 307 remaining in circuit. This effects energization of the track shoe devices to a maximum degree.

Current flowing through the portion of resistance device 307 effects energization of the inner winding 132 in the compensating magnet valve section 38, so that the downward force now exerted on the diaphragm 127 is that due to the combined action of the two windings 132 and 133. Or in other words, the force acting downwardly upon the diaphragm is that proportional to the effectiveness of both the dynamic brake system and the track brake system, while the force acting upwardly on the diaphragm is that proportional to the potential effectiveness of the fluid pressure brake system. The parts are so designed that under these conditions the downwardly acting force prevails so long as the vehicle speed is above a predetermined low value.

Therefore, so long as the combined effectiveness of the two electric brake systems is equal to or greater than the potential effectiveness of the fluid pressure brake system, the fluid pressure brake system will be held in release and all braking will be accomplished by the two electric brake systems.

Opening of relay contacts 281 opens one of the branch circuits, before described, between the resistance device 307 and the compensating magnet valve winding 132. This forces the current supplied to this winding to pass through the resistance 343. Therefore, whenever the track controller device 28 has been rotated to its extreme application position the resistance 343 is effective in controlling the energization of winding 132, whereas at other times current may bypass this resistance through relay contacts 281. It has been determined from actual tests that by including the resistance 343 in this circuit when the track shoe devices are energized to a maximum degree a smoother and more satisfactory action of the compensating magnet valve section 38 is obtained.

If now the foot pedal 32 is depressed further, it will be obvious from the cam development shown in Fig. 3 that only the cam 316 is effective in further increasing the braking effect of any one brake system. This cam will then operate the brake valve section 42 to further increase the degree of fluid under pressure supplied to the pressure chamber 144. As a consequence, the pressure acting upwardly on the diaphragm 127 of the compensating magnet valve device will slightly overbalance the pressure acting downwardly on the diaphragm due to the combined action of the two electric brake systems, and fluid under pressure will then flow to the relay valve piston chamber 85. Fluid will also flow via passage 386 to chamber 124, so that when a pressure corresponding to the overbalance has been reached, slide valve 126 will be actuated downwardly to lap passages 375 and 376. Thus only a light application of the fluid pressure brake system is effected.

If there were no change in the effectiveness of the two electric brake systems, then the vehicle would be brought to a stop with only a light application of the fluid pressure brake system effective. However, as the speed of the vehicle diminishes, the effectiveness of the dynamic brake system will at some very low speed begin to diminish, and as a consequence the downward force on diaphragm 127 will diminish. The diaphragm will then be actuated upwardly to increase the degree of application of the fluid pressure brake system to compensate for the decrease in effectiveness of the dynamic brake system. The vehicle will then be brought to a stop with an increased degree of application of the fluid pressure brakes.

It should also be apparent that whether the downward force acting on diaphragm 127 is diminished due to the diminution of either the dynamic braking effect or the track braking effect, the fluid pressure brakes will be increasingly applied to compensate for the decrease in effectiveness of either or both of the two electric brake systems.

It is to be here understood that for any given position of the foot pedal 32, the potential effectiveness of the fluid pressure brake system is equivalent to the potential effectiveness of the two electric brake systems combined. Thus should both of the electric brake systems fail during an application, the fluid pressure brake system would immediately be applied to a degree equivalent to that to which the two electric brake systems were applied. The configurations of the cams 316, 318 and 320, as shown in Fig. 3 in developed form, have been designed to effect this result.

When the vehicle is brought to a stop and a passenger or passengers are standing on the door treadle, fluid under pressure is supplied through pipe 390 to the piston chamber 179 to actuate the piston 178 to the left, to hold the brake valve lever 172 in application position. The mechanism for supplying fluid under pressure to the chamber 179 has been omitted from the present application, but is fully described and claimed in my co-pending application Serial No. 698,231 for a Door and brake interlock device, filed November 16, 1933.

To effect a release of the brakes, pressure is released on the foot pedal 32, whereupon spring 344 returns the foot pedal 32 and shaft 321 to release position, the other parts then returning to the positions shown in the drawings. All three brake systems will therefore be released and the vehicle is again free to be propelled by the driving motors.

When the foot pedal 32 is depressed to a degree such that the cams rotate beyond the point corresponding to the line c in Fig. 3, it will be noted that the rollers 329 and 336 pass onto dwell portions of cams 318 and 320. The opposition to movement of the foot pedal exerted by the cams will therefore be less as the cams rotate past this point, while it is desirable that the opposition remain the same, so that the fluid pressure brakes will not be unnecessarily applied because of non-uniform pedal pressure. To prevent this, the spring-pressed plunger 347 on the shaft 321 is arranged so that as the cams arrive at the point corresponding to the line c in Fig. 3 the plunger 347 engages the stop 348 and thereafter opposition to movement of the foot pedal 32 is opposed both by the spring 344 and the spring 349. This provides for a more uniform movement of the foot pedal 32 throughout its entire range of movement.

*Emergency application*

When it is desired to effect an emergency application of the brakes, this may be done either by simultaneously releasing manually applied pressure to the hand element 204 of the hand valve device 18 and the foot pedal 218 of the foot valve device 16, or by operation of the lever 246 of the vent valve device 198. Assuming first that pressure is simultaneously released from the hand element 204 and the foot pedal 218, valve 200 of the hand valve device 18 will be seated to cut off communication between the safety control pipe 196 and the main reservoir, while at the same time valve 216 in the foot valve device 16 will also be seated to accomplish a similar function. Diaphragm 226 in foot valve device 16 will then be unseated, as will diaphragm 210 in hand valve device 18. The safety control pipe 196 will therefore be vented to the atmosphere.

The reduction in safety control pipe pressure causes a like reduction of pressure in the emergency piston chamber 117. The overbalancing pressure above the piston from the slide valve chamber 114 then actuates the piston 116 downwardly to its lowermost position. The slide valve 112 is then shifted to application position, in which the communication between passages 368 and 370 is cut off and port 365 in the slide valve registers with the passage 370. At the same time, a cavity 392 in the slide valve connects passages 366 and 394. Passage 368 is at this time blanked by the slide valve.

The registration of slide valve port 365 with passage 370 causes fluid under pressure to be supplied from the main reservoir 46 to the relay piston chamber 85 and also to the pipe 242 connecting with the pneumatic switch device 275 and the supply chamber 237 of the cut-off valve device 14.

The communication from the main reservoir 46 to the relay piston chamber 85 includes pipe and passage 53, passage 120, slide valve chamber 114, port 365, passages 370 and 371, past the unseated valve 138, passage 372, port 374, passages 375 and 376, and through passage 377 to the relay piston chamber. This communication will be fully open, because, as will appear later, the delay magnet valve device 40 and the compensating magnet valve device 38 are not operated during an emergency application of the brakes.

The connection of the passages 366 and 394 by the slide valve cavity 392 effects a communication from the sanding reservoir 364 to a sand pipe 396. Fluid under pressure then flows from the sanding reservoir 364, through pipe and passage 366, cavity 392, and passage 394, to the sand pipe 396. Fluid in the sand pipe 396 flows to piston chamber 359 of the pneumatic switch device 354 and also to a sanding device 398 which is operated to deposit sand on the track rails. This device is shown in diagrammatic form only, but it is to be understood as being preferably one of the types commonly employed for this purpose.

In the pneumatic switch device 354, the piston 358 responds to a relatively low pressure and is actuated upwardly to open contacts 353 and close contacts 362. Opening of contacts 353 disconnects the winding 132 of the compensating magnet valve device from the resistance device 307, while closing of contacts 362 completes a circuit direct from the trolley 258 to the relay 388, which circuits include conductor 300 and 400, contacts 362, conductor 401, and relay 388, the return connection being by way of ground connection 402. Relay 388 closes its contacts 389 to energize the track shoe devices 24 through the same circuit established when the drum 295 of the track controller device 28 is operated to its extreme application position. At the same time, closing of contacts 362 energizes the magnet valve device 26 to permit the track shoe devices to drop to the rail.

It will thus be seen that during an emergency application the fluid pressure brakes and the track brakes are applied, but the dynamic brake system is wholly ineffective. At the same time, sand is deposited on the rails, so that the adhesion between wheels and rails is increased to permit a higher degree of braking. Since the emergency valve section 36 connects the main reservoir 46 directly to the relay valve piston chamber 85, it will be obvious that the relay valve will operate to supply fluid under pressure to the brake cylinder 10 to a maximum degree. And since the relay 388 by-passes the resistance 306 of the track brake controller device 28, both the fluid pressure brakes and the track brakes will be applied to a maximum degree, so that the vehicle will be brought to a stop in a relatively short distance.

If the vent valve device 198 had been operated instead of releasing pressure simultaneously on the hand element 204 and the foot pedal 218, the safety pipe 196 would have been vented as before, and the operation would have been as just described.

Now when a service application is effected, fluid under pressure is supplied to the supply chamber 237 of the cut-off valve device 14. When the pressure of the fluid thus supplied to this chamber reaches a predetermined value, valve 235 is actuated to its upper seated position to connect chambers 234 and 237. Fluid acting upon the diaphragm 233 effects seating of the valve 232. This isolates that portion of the safety control pipe 196 to the left of the cut-off valve device. Therefore, when the valve 232 is seated the operator may simultaneously release pressure on both the hand element 204 and the foot pedal 218 without effecting an emergency application of the brakes.

The choke 384 delays seating of the valve 232 for a time sufficient to completely vent the safety control pipe when effecting an emergency application by operation of the hand valve 18 and foot valve 16.

To effect a release of the brakes following an emergency application, pressure must again be applied to either the hand element 204 or the foot pedal 218, and of course the valve 244 in the vent valve device 198 must be seated, so that the safety control pipe 196 may be recharged through either the safety valve device 18 or the foot valve device 16. As the pressure in the safety control pipe builds up, emergency piston 116 will be actuated upwardly to the position shown in Fig. 2, where the safety control pipe may be also charged through the feed groove 122, and the sanding reservoir 364 recharged through the slide valve port 365.

In order that the safety control pipe to the right of the cut-off valve device 14, and consequently the emergency piston chamber 117, may be recharged when pressure is again applied to one or the other of the hand elements 204 and the foot pedal 218, following an emergency application, a by-pass communication around the cut-off valve device 14 is provided, comprising a pipe 404 and a check valve device 405. This check valve device 405, like the aforementioned check valve device 202, comprises a ball valve 406 which is operable to permit flow of fluid in a direction toward the emergency piston chamber 117, and operable to prevent a flow in the reverse direction. Therefore, a release of the brakes following an emergency application may readily be effected even though the valve 232 of the cut-off valve device 14 is seated.

It is to be here noted that after a service application has been made to a degree such that valve 232 of the cut-off valve device has been seated, it is still possible to effect an emergency application on top of this service application, by operation of the vent valve device 198. It should be obvious from the foregoing description that by venting that portion of the safety control pipe 196 to the right of the cut-off valve device an emergency application will be effected on top of the existing service application.

*Auxiliary features*

While the safety control pipe 196 is fully charged, piston 184 in piston chamber 185, associated with the brake valve section 42 of the control valve device, is maintained in its left hand position. If now following a predetermined service application effected by operation of the brake valve section 42, the operator releases pressure on both the hand element 204 and the foot pedal 218, the piston 184 will move to the right and cause frictional engagement between the cams 189 and 190. This will hold the lever 172 in application position, even though the operator removes pressure from the foot pedal 32. Therefore, it is possible to hold the brake valve section 42 in applied position by merely simultaneously removing pressure from the hand element 204 and foot pedal 218.

Whenever a service application of the brakes is effected by operation of the brake valve section 42, the supply of fluid under pressure to the brake cylinder from the main reservoir 46 may cause a sharp drop of pressure in the piping connected to the main reservoir. In order that this drop in pressure shall not be reflected in the safety control pipe 196, the check valve device 202 is connected in the line between the main reservoir pipe 201 and the main reservoir, as shown in Fig. 1—A. As will be readily apparent, a reduction of pressure in the pipe 53 will be prevented from causing a similar reduction of pressure in the main reservoir pipe 201.

If for any reason either the delay magnet valve device 40 or the compensating magnet valve device 38 were rendered inoperative, or it was desired to by-pass these devices, a plug 410 in the control valve device just below the emergency valve section 36 may be removed, thereby connecting passages 370 and 377, so that fluid supplied either by operation of the brake valve section 42 or the emergency valve section 36 may flow to the relay valve piston chamber 85 without passing through the magnet valve device 40 and the compensating magnet valve device 38.

When it is desired to control an application of the brakes from the rear end of the train, the handle 254 of the rear end brake valve device 252 is moved to the position indicated in dotted lines. When controlling an application from the rear end of the train, the safety control pipe 196 will have previously been vented due to release of pressure on the hand element 204 and the foot pedal 218 at the head end of the train. The fluid pressure brake will thus be applied. Therefore, when the handle 254 is moved to the position indicated in dotted lines, main reservoir pipe 201 is connected to pipe 255, and that portion of the safety control pipe 196 above the double check valve 241 will be recharged. The emergency valve section 36 will then function to effect a release of the brakes and the vehicle will be free to move in a backward direction.

When it is desired to apply the brakes, the handle 254 is moved to the position shown in solid lines, where the pipe 255, and the safety control pipe 196, may be vented to the atmosphere to a desired degree, to effect the desired automatic application of the brakes. This handle can of course be manipulated thereafter according to the braking desired.

If at any time before an application of the brakes is effected by operation of the foot pedal 32, it is desired to render the track brake system ineffective, as when switching the vehicle about the terminal yards, the operator may depress the push button 302, thereby interrupting the circuit to the magnet valve device 26. Then when the foot pedal 32 is depressed, the magnet valve device 26 will not be operated to effect lowering of the track shoe device to the rail. Even though the track shoe devices may be energized, they will be positioned an ineffective distance above the rail and will not produce any appreciable braking effect on the vehicle. The shoes will not therefore strike obstructions which might be present on the track system during this operation of the vehicle.

While the hand valve device 18 has been illustrated as an independent valve device, it is to be understood that it may be incorporated as part of the motor controller 260 with the hand element 204 forming the handle of the controller, as has been common practice heretofore.

It should be understood that the effective use of the compensating magnet valve device 38 is not limited to brake equipments employing both dynamic brakes and magnetic track brakes, but may be employed with systems having only one of these brakes. For example, if it is desired to omit the dynamic brake from the equipment illustrated, then the delay magnet valve device 40 may also be omitted and replaced by a cap connecting passages 371 and 372, in which case the compensating magnet valve device 38 need have only the one winding 132 which is connected to the track brake circuit. Referring then to Fig. 3, when the foot pedal is depressed and the cams moved through the distance represented between the lines a—b the fluid pressure brake only will be applied. When the cams are rotated through the distance represented between lines b—c the track brake will in addition be applied and the fluid pressure brake may then be suppressed to the value attained as represented for the position of the cam 316 at the line b. Beyond the line c the fluid pressure brake will be increased while the track brakes will remain constantly applied to the maximum degree. If this sequence of operation is not desired other sequences may be obtained by varying the configurations of the cams 316 and 318.

While I have described my invention with particular reference to a single embodiment thereof, it is to be understood that I do not wish to be limited to the specific details or arrangements of parts disclosed and described in this single embodiment, nor otherwise than by the spirit and scope of the appended claims.

Having now described my invention, what I claim as new and desire to secure by Letters Patent, is:

1. In a vehicle brake equipment, in combination, a fluid pressure brake system, a dynamic brake system, a track brake system, control means for controlling applications of all of said brake systems, means controlled by said dynamic brake system for delaying application of said fluid pressure brake system for a predetermined length of time, and means controlled jointly by said dynamic brake system and said track brake system for limiting the degree of application of said fluid pressure brake system.

2. In a vehicle brake equipment, in combination, a fluid pressure brake system, a dynamic brake system, a track brake system, a valve mechanism for controlling a communication through which fluid under pressure is supplied to effect an application of said fluid pressure brake system, said valve mechanism having a plurality of windings and controlling said communication according to the combined degree of energization of said windings, means for energizing one of said windings according to the effectiveness of said dynamic brake system, and means for energizing the other of said windings according to the effectiveness of said track brake system.

3. In a vehicle brake equipment, in combination, a brake cylinder, a track shoe device, an electrodynamic brake device, means for controlling operation of each of said brake devices, a valve device for controlling a communication through which fluid under pressure is supplied to effect a supply of fluid under pressure to said brake cylinder, said valve device having a plurality of windings and a diaphragm subject on one side to pressure of said fluid supply and on the other side to the magnetic force produced by energization of said windings, means for energizing one of said windings according to the operation of said electrodynamic brake device, and means for energizing the other of said windings according to operation of said track shoe device.

4. In a vehicle brake equipment, in combination, an electrodynamic brake device, a brake cylinder, means for controlling operation of said electrodynamic brake device and the supply of fluid under pressure to said brake cylinder, electroresponsive valve means for controlling a communication through which fluid under pressure is supplied to effect a supply of fluid under pressure to said brake cylinder, means for energizing said electroresponsive valve means to close said communication when said electrodynamic brake device is cut into action, and fluid pressure operated means for subsequently effecting deenergization of said valve means.

5. In a vehicle brake equipment, in combination, an electric brake system, a fluid pressure brake system, means for controlling applications of both of said brake systems, an electroresponsive valve device for controlling a communication through which fluid under pressure is supplied to effect an application of said fluid pressure brake system, means for energizing said electroresponsive valve device to close said communication when said electric brake system is cut into action, and means responsive to the pressure of fluid supplied through said communication for subsequently deenergizing said electroresponsive valve device to open said communication.

6. In a vehicle brake equipment, in combination, a fluid pressure brake system; a dynamic brake system; a track brake system; manually operable means for controlling all of said brake systems; means responsive to operation of said control means through a first zone for conditioning said dynamic brake system and fluid pressure brake system to be operable to produce a braking effect; means responsive to operation of said control means through a second zone for conditioning said fluid pressure brake system, dynamic brake system and track brake system to be operable to produce a braking effect; means for preventing the fluid pressure brake system from effectively producing a braking effect when said control means is operated through said first and second zones; and means responsive to operation of said control means through a third zone for causing said fluid pressure brake system to become effective.

7. In a vehicle brake equipment, in combination, a fluid pressure brake system, a track brake system, a dynamic brake system, manually operable control means for controlling applications of said brake systems, said control means having a first zone in which said fluid pressure brake system and dynamic brake system only are conditioned to be effective, and having a second zone in which all of said brake systems are conditioned to be effective, and having a third zone in which said track and dynamic brake systems are applied to a maximum degree and said fluid pressure brake system may be applied to an increasing degree, and yielding means for opposing operation of said control means in said third zone.

8. In a vehicle brake equipment, in combination, a fluid pressure brake system, a dynamic brake system, a track brake system, manually operated control means, means responsive to operation of said control means for conditioning said three brake systems to be operable to produce a braking effect, means controlled by said dynamic and track brake systems for preventing said fluid pressure brake system becoming effective, a pipe normally charged with fluid under pressure, and means operated upon a reduction of pressure in said pipe for rendering said fluid pressure brake means effective.

9. In a vehicle brake equipment, in combination, a fluid pressure brake system, a track brake system, a dynamic brake system, manually operated means for conditioning all of said brake systems to be effective to produce a braking effect, means for preventing said fluid pressure brake system producing a braking effect when said three brake systems are conditioned by said manually operated control means, a pipe normally charged with fluid under pressure, and means operative upon reduction of pressure in said pipe for rendering said fluid pressure brake system and at least one of said other brake systems effective to produce a braking effect independently of operation of said manually operated means.

10. In a vehicle brake equipment, in combination, an electric brake system, a fluid pressure brake system, manually operated control means, means responsive to operation of said control means to application position for conditioning said two brake systems to be operable to produce a braking effect, and operative upon operation of said control means to release position to cut both of said brake systems out of action, a pipe normally charged with fluid under pressure, means normally held depressed by an operator and operative upon release of said pressure to vent said pipe, and means operative upon reduction of pressure in said pipe for holding said fluid pressure brake system applied when said control means is operated to release position.

11. In a vehicle brake equipment, in combination, an electric brake system, a fluid pressure brake system, control means operable to control the degree of application of the electric brake system, a pipe normally charged with fluid under pressure, means operative upon a reduction of pressure in said pipe for effecting an application of said fluid pressure brake means, and means also operative upon the same reduction of pressure in said pipe for effecting an application of said electric brake means independently of operation of said control means.

12. In a vehicle brake equipment, in combination, fluid pressure brake means, electric brake means, a circuit for supplying current to energize said electric brake means, a resistance device in said circuit, means for supplying fluid under pressure to effect an application of said fluid pressure brake means, and an electroresponsive valve device responsive to the degree of current supplied to said electric brake means through said resistance device for controlling the supply of fluid under pressure to operate said fluid pressure brake means.

13. In a vehicle brake system, in combination, a brake cylinder, a pipe normally charged with fluid under pressure, a first valve device operable to effect a reduction of pressure of the fluid in said pipe, automatic valve means operated upon a reduction of pressure in said pipe for effecting a supply of fluid under pressure to said brake cylinder, manually controlled means for also effecting a supply of fluid under pressure to said brake cylinder, a cut-off valve device responsive to a predetermined pressure of fluid supplied by said manually controlled means for preventing operation of said automatic valve means when said first valve device is operated to reduce the pressure in said pipe, and a check valve device operable to effect a by-pass communication around said cut-off valve device to permit charging of said pipe.

14. A control valve device comprising in combination, a relay valve device operable to effect a supply of fluid under pressure to effect an application of the brakes, a brake valve device for effecting a supply of fluid under pressure to control operation of said relay valve device, means providing a communication between said brake valve device and said relay valve device, a magnet valve device for opening and closing said communication, and a compensating magnet valve device for limiting the pressure of fluid supplied through said communication according to the degree of energization thereof.

15. A control valve device comprising in combination, a relay valve device, a brake valve device for controlling operation of said relay valve device, means providing a communication between said brake valve device and relay valve device, a magnet valve device operable when energized to close said communication and when deenergized to open said communication, a restricted by-pass communication around said magnet valve device, a compensating magnet valve device for limiting the pressure of fluid supplied through said communication according to the degree of energization thereof, and an automatic valve device operable to isolate said brake valve device and assume control of said relay valve device.

16. A control valve device comprising in combination, a relay valve device, means providing a communication through which fluid under pressure is supplied to operate said relay valve device, a brake valve device manually operable to different application positions to supply fluid under pressure through said communication to different degrees, said brake valve device having fluid pressure means associated therewith for actuating it to and holding it in an application position, a magnet valve device operable when energized to close said communication and operable when deenergized to open said communication, a compensating magnet valve device operable to limit the pressure of fluid supplied through said communication according to the degree of energization thereof, and an automatic valve device operable to isolate said brake valve device and supply fluid under pressure to said communication independently of said brake valve device.

17. In a vehicle brake system, in combination, a track brake device, means for maintaining said track brake device in a raised position above a track rail, a circuit for supplying current to said means to effect lowering of said track brake device, a control device for controlling the supply of current to said circuit, and a manually operated switch for opening said circuit at will.

18. In a vehicle brake system, in combination, a track brake device, a fluid pressure brake device, an electroresponsive valve device for controlling a communication through which fluid under pressure is supplied to effect operation of said fluid pressure brake device, parallel circuits for energizing said electroresponsive valve device according to energization of said track brake device, a resistance device in one of said circuits, and means for opening the other of said circuits when said track brake device is energized to a maximum degree.

19. In a vehicle brake system, in combination, magnetic track brake means, fluid pressure brake means, electroresponsive means operative when said track brake means is effective for controlling operation of said fluid pressure brake means, fluid pressure operated switch means for controlling said electroresponsive means, and a valve mechanism operated upon a decrease in pressure for effecting operation of said switch means to render said electroresponsive means ineffective to control operation of said fluid pressure brake means.

20. In a vehicle brake system, in combination, magnetic track brake means, fluid pressure brake means, electroresponsive means operative when said track brake means is effective for controlling operation of said fluid pressure brake means, normally closed contacts adapted when opened to render said electroresponsive means ineffective to control said fluid pressure brake means, normally open contacts adapted when closed to effect application of said magnetic track brake means, a normally charged pipe, and means operated upon decrease of pressure in said pipe for effecting opening of said normally closed contacts and closing of said normally open contacts.

21. In a vehicle brake equipment, in combination, a fluid pressure brake device, means for establishing a communication through which fluid under pressure is supplied to effect an application of said fluid pressure brake device, an electroresponsive valve device controlling said communication and operable when energized to close and hold closed said communication until deenergized, a circuit for supplying current to energize said electroresponsive valve device, and a fluid pressure operated switch device having normally closed contacts adapted when opened to open said circuit.

22. In a vehicle brake system, in combination, a self-lapping brake valve device operable to establish a communication through which fluid under pressure is supplied according to the degree of operation of said brake valve device, a valve operable when shifted from a biased position to a cut-off position to close said communication, and an electromagnet operable when energized to any degree above a predetermined degree to shift said valve to said cut-off position, regardless of the degree of fluid under pressure supplied to said communication.

23. In a vehicle brake equipment, in combination, a plurality of brake systems, means for effecting an application of each of said brake system, means operative upon effecting said application for inhibiting the effective operation of one of said brake systems, means unaffected by the degree of application of the other of said brake systems for causing said inhibited brake system to become effective after a chosen definite interval of time, and means for controlling the degree of application of said inhibited brake system according to the degree of effectiveness of the other of said brake systems.

24. In a vehicle brake equipment, in combination, an electric brake system, a fluid pressure brake system, means for effecting the operation of each of said brake systems to produce a braking effect, means rendered effective upon initiating said operation for delaying effective operation of one of said brake systems, means controlled by said delayed brake system for rendering it effective after a predetermined length of time, and means controlled by the undelayed brake system for controlling the degree of application of the delayed brake system.

25. In a vehicle brake equipment, in combination, a fluid pressure brake system, an electric brake system, means for effecting the operation of both of said brake systems to produce a braking effect, means for preventing any substantial degree of effectiveness of the fluid pressure brake system for a predetermined length of time and being unaffected by the degree of application of the electric brake system, and means governed by the effectiveness of the electric brake system for limiting the degree of application of the fluid pressure brake system.

26. In a vehicle brake equipment, in combination, a fluid pressure brake system, an electric brake system, means for controlling applications of both of said brake systems, means controlled by the electric brake system for delaying the effectiveness of the fluid pressure brake system on initiating an application of the brakes, means operative independently of the effectiveness of the electric brake system for subsequently rendering the fluid pressure brake system effective after a chosen interval of time, and means governed by the effectiveness of the electric brake system for limiting the degree of effectiveness of the fluid pressure brake system.

27. In a vehicle brake equipment, in combination, a fluid pressure brake system, an electric brake system, a single manually operable means for controlling application of both of said brake systems, means responsive to operation of said manually operable control means for supplying fluid under pressure to effect an application of said fluid pressure brake system, means operable upon initiating application of the electric brake system for limiting the rate of said supply of fluid under pressure, means governed by the pressure of said supply for subsequently increasing the rate of supply, and means governed by the electric brake system for controlling the degree of said supply in accordance with the effectiveness of the electric brake system.

28. In a vehicle brake equipment, in combination, a fluid pressure brake means, an electric brake means, manually operated control means, means responsive to operation of said control means for supplying fluid under pressure to effect an application of said fluid pressure brake means and for rendering said electric brake means effective to produce a braking effect, said electric brake means being normally slower acting than said fluid pressure brake means, means operative upon initiating said application of said two brake means for delaying the effective application of said supply of fluid under pressure for an interval of time sufficient for said electric brake means to become effective, and means governed by the effectiveness of said electric brake means for controlling the degree of said supply.

29. In a vehicle brake system, in combination, an electric brake means, a circuit for supplying current to energize said electric brake means, a control device operable to control the degree of current supplied to said brake means and having a plurality of application positions one of which is a maximum position, a by-pass circuit around said control device, a relay operable to close said by-pass circuit, and means whereby said relay is operated to close said by-pass circuit when said control device is in said maximum application position.

30. In a vehicle brake equipment, in combination, a fluid pressure brake system, a magnetic track brake system, a circuit for supplying current to operate said track brake system, a valve mechanism for controlling a communication through which fluid under pressure is supplied to effect an application of said fluid pressure brake system, said valve mechanism having a winding connected to said circuit and controlling said communication according to the degree of current flowing in said circuit, and means for varying the current in said circuit according to the desired degree of application of said track brake system.

31. In a vehicle brake equipment, in combination, a fluid pressure brake system; a magnetic track brake system; manually operable means for controlling said two brake systems; means responsive to operation of said control means through a first zone for conditioning said fluid pressure brake system to produce a braking effect; means responsive to operation of said control means through a second zone for conditioning said fluid pressure brake system and said magnetic track brake system to produce a braking effect each; means for suppressing the degree of application of said fluid pressure brake system in accordance with the degree of effectiveness of said magnetic track brake system when said control means is operated in said second zone; and means responsive to operation of said control means through a third zone for increasing the degree of application of said fluid pressure brake system.

32. In a vehicle brake equipment, in combination, a fluid pressure brake system; a magnetic track brake system; manually operable means for controlling said two brake systems; means responsive to operation of said control means through a first zone for conditioning said fluid pressure brake system to produce a braking effect; means responsive to operation of said control means through a second zone for conditioning said fluid pressure brake system and said magnetic track brake system to produce a braking effect each; means for suppressing the degree of application of said fluid pressure brake system in accordance with the degree of effectiveness of said magnetic track brake system when said control means is operated in said second zone; means responsive to operation of said control means through a third zone for increasing the degree of application of said fluid pressure brake system; and a foot pedal device for actuating said control means.

33. In a vehicle brake equipment, in combination, a fluid pressure brake system; a magnetic track brake system; manually operable means for controlling said two brake systems; means responsive to operation of said control means through a first zone for conditioning said fluid pressure brake system to produce a braking effect; means responsive to operation of said control means through a second zone for conditioning said fluid pressure brake system and said magnetic track brake system to produce a braking effect each; means for suppressing the degree of application of said fluid pressure brake system in accordance with the degree of effectiveness of said magnetic track brake system when said control means is operated in said second zone; means responsive to operation of said control means through a third zone for increasing the degree of application of said fluid pressure brake system; said control means comprising a plurality of cams arranged to effect the above stated sequence; and a foot pedal device for actuating said cams.

34. In a vehicle brake system, in combination, fluid pressure brake means, magnetic track brake means, control means for conditioning each of said two brake means to become operative to produce a braking effect, electroresponsive means for controlling the effectiveness of said fluid pressure brake means according to the effectiveness of said magnetic track brake means, and means including a fluid pressure operated switch device operated upon a variation of pressure therein to render said last means ineffective whereby the degree of application of each of said two brake means is controlled alone by said control means.

35. In a vehicle brake system, in combination, a brake cylinder, a track brake device, dynamic brake means, a brake valve device operable to supply fluid under pressure to said brake cylinder, an electric controller means operable to control the application of said track brake device and the connection of said dynamic brake means in a dynamic braking circuit, common actuating means for actuating said brake valve device and said electric controller means in unison, and an electroresponsive device operable to close communication to the brake cylinder when the dynamic braking circuit is formed and the dynamic braking means is effective.

36. In a vehicle brake system, in combination, a brake cylinder, a track brake device, dynamic brake means, a brake valve device operable to supply fluid under pressure to said brake cylinder, an electric controller means operable to control applications of said track brake device and the connection of said dynamic brake means in a dynamic braking circuit, common actuating means for actuating said brake valve device and said electric controller means in unison to control applications of the brakes, resistance means for connection in the dynamic braking circuit, and a magnet valve device energized upon the flow of dynamic braking current in said resistance means for closing communication to the brake cylinder.

37. In a vehicle brake system, in combination, a brake cylinder, track brake means, dynamic brake means, a brake valve device for controlling the supply of fluid under pressure to the brake cylinder, an electric controller means for controlling the application of said track brake means and the connection of said dynamic brake means in ... namic braking circuit, common actuating means for actuating said brake valve device and said electric controller, a foot pedal device for operating said common actuating means, and an electroresponsive valve means operable when said foot pedal has been actuated sufficiently to connect said dynamic brake means in said dynamic braking circuit to close communication to the brake cylinder, and operable to open said communication when the effectiveness of said dynamic brake means diminishes below a predetermined degree.

38. In a vehicle brake system, in combination, a brake cylinder, a track brake device, dynamic brake means, a brake valve device for supplying fluid under pressure to the brake cylinder, an electric controller means for controlling the application of said track brake device and connection of said dynamic brake means in a dynamic braking circuit, means including a common rotatable shaft for actuating said brake valve device and said electric controller means in unison, and a foot pedal device for rotating said shaft.

39. In a vehicle brake system, in combination, a brake cylinder, a track brake device, dynamic brake means, a brake valve device for supplying fluid under pressure to the brake cylinder, an electric controller means for controlling the application of said track brake device and connection of said dynamic brake means in a dynamic braking circuit, means including a common rotatable shaft for actuating said brake valve device and said electric controller means in unison, a foot pedal device for rotating said shaft, and a safety control device adapted to be normally held depressed by an operator and operative upon release by the operator to effect the application of at least one of said three brake means.

40. In a vehicle brake system, in combination, brake means, a brake valve device operable to application position to effect an application of said brake means, means operated upon a release of fluid under pressure therefrom to hold said brake valve device in application position, and a control valve mechanism operated upon the release of pressure manually applied thereto for effecting a release of fluid under pressure from said last mentioned means.

41. In a vehicle brake system, in combination, a brake cylinder, a brake valve device operable to application position to effect a supply of fluid under pressure to said brake cylinder, fluid pressure operated means operated upon a release of fluid under pressure therefrom to hold said brake valve device in application position, and a valve device having an element normally held depressed by an operator and operated upon release by the operator for effecting a release of fluid under pressure from said fluid pressure operated means.

ELLIS E. HEWITT.